Nov. 19, 1968  G. A. SKILLIN  3,411,372
REMOTELY CONTROLLED MIRROR
Filed Aug. 4, 1966
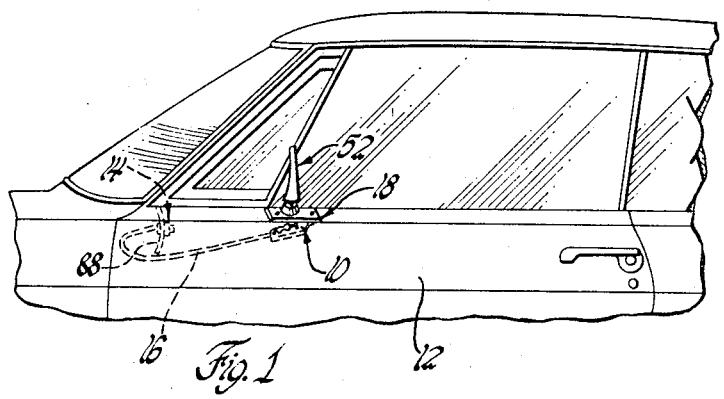
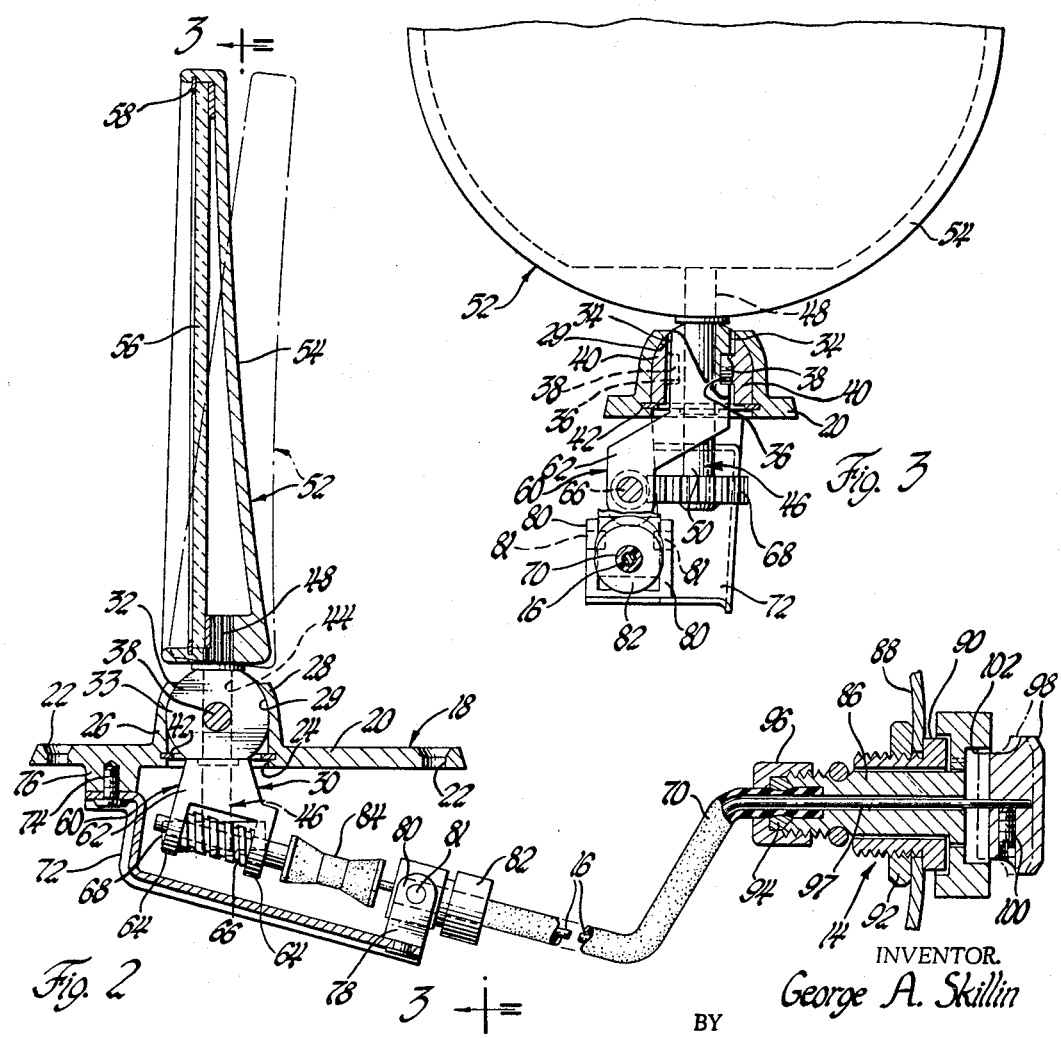
INVENTOR.
George A. Skillin
BY
C. J. Biskup
ATTORNEY

United States Patent Office

3,411,372
Patented Nov. 19, 1968

3,411,372
REMOTELY CONTROLLED MIRROR
George A. Skillin, Utica, Mich., assignor to General Motors Corporation, Detroit, Mich., a corporation of Delaware
Filed Aug. 4, 1966, Ser. No. 570,216
6 Claims. (Cl. 74—501)

ABSTRACT OF THE DISCLOSURE

A remotely controlled mirror wherein a mirror assembly is fixedly connected to one end of a shaft that is rotatably supported by a pivot member. The pivot member, in turn, is universally supported within a socket formed by a mounting bracket. Gearing at the other end of the shaft is operable through a flexible cable controlled by a remotely located actuator such that rotation of the cable positions the mirror assembly about a vertical axis while axial movement of the cable positions the mirror assembly about a horizontal axis.

---

The remotely controlled mirror according to this invention, comprises a mirror assembly fixedly connected at one end of a rotatable shaft and pivotally supported by a pivot member held in socket means formed in the mounting bracket of the mirror. Gear means at the lower end of the shaft are operable through a flexible cable controlled from a remotely located actuator in a manner whereby rotation of the cable actuates the gear means to turn the shaft and mirror assembly about a first fixed axis while axial movement of the cable pivotally positions the mirror assembly about a second fixed axis mutually perpendicular to the first axis.

One feature of this invention is that it provides a remotely controlled mirror mechanism wherein the mirror assembly may be adjusted about mutually perpendicular first and second axes by means of a single operating cable associated with mechanism which initiates pivotal movement of the mirror about the first axis when the cable is shifted axially and pivotal movement about the second axis when the cable is rotated.

Another feature of this invention is that the mirror assembly is supported upon a rotatable shaft which may be rotated about its axis by an operating cable through a gear connection.

Still another feature of this invention is that the mirror actuating mechanism is contained below the mirror mounting bracket rather than in the mirror housing thus permitting a small, attractively styled exterior mirror.

These and other features of the invention will be made apparent in the following detailed description taken in connection with the accompanying drawing wherein:

FIGURE 1 is a fragmentary view of a vehicle incorporating a remotely controlled rear view mirror mechanism according to the present invention;

FIGURE 2 is an enlarged view, partially in section, of the rear view mirror mechanism of FIGURE 1; and FIGURE 3 is a view taken substantially on the line 3—3 of FIGURE 2.

Referring initially to FIGURE 1, there is shown an illustrative embodiment of the invention wherein a mirror structure 10 is mounted on the exterior side of the door 12 of a motor vehicle. The mirror is remotely positionable by operation of an actuator 14 mounted at any convenient place interiorly of the vehicle. The mirror structure 10 and actuator 14 are operatively connected by a flexible operating cable 16.

As seen in FIGURE 2, the mirror structure 10 includes a mounting bracket 18 having a base 20 with holes 22 therein adapted to receive screws for attaching the bracket to the exterior sheet metal of the vehicle door 12. An aperture 24 in the center portion of base 20 is surrounded by upwardly extending annular wall 26 which is curved inwardly at its upper end to form a socket 28 with an inner spherical seating surface 29. A head portion 32 of pivot member 30 is received through the aperture 24 and has an outer circumferential seating surface 33 which cooperatively engages socket seating surface 29. The head portion 32 is also formed with a pair of spaced planular side walls 34 having horizontal axially aligned recesses 36 therein which receive coaxial pivot pins 38 projecting from support members 40. The support members 40 are themselves held within socket 28 by a retainer ring 42. Pivot member 30 is thus pivotally swingable about a horizontal axis passing through the pivot pins 38.

A mirror support shaft 46 is received through a vertically oriented bore 44 in head portion 32 and has end portions 48 and 50, respectively, extending above and below the mounting bracket 22. Shaft 46 is freely rotatable within bore 44 about its longitudinal axis which lies mutually perpendicular to the pivot axis of pivot member 30. A mirror assembly 52 is fixedly received upon end portion 48 of shaft 46 for rotation therewith and includes a mirror housing 54 of any suitable shape and a mirror 56 securely retained in mirror housing 54 by a retainer ring 58.

A downwardly depending leg 60 forming an integral part of pivot member 32 has an offset or dog-legged portion 62 with axially spaced flange members extending therefrom. Flange members 64 are suitable adapted to freely support a worm 66 for rotation therebetween and in spaced relation to end portion 50 of shaft 46. A worm wheel 68 affixed to shaft end portion 50 meshes with worm 66 to rotate shaft 46 about its longitudinal axis when driven by worm 66. Thus, it should be apparent that mirror assembly 52 is pivotally swingable with pivot member 30 about a horizontal axis through pivot pins 38 and movable about a vertical axis or the axis of shaft 46 as a result of the latter being rotated.

The flexible operating cable 16 is preferably encased in a conventional protective sheath 70 and is both axially and rotatably movable therein. The sheath 70 is held stationary at both ends and is flexible over its intermediate length. Referring to FIGURE 2, a support member 72 is suspended from the underside of bracket 18 by screw means 74 which are threadably received within a threaded recess in boss 76. Support member 72 extends initially downwardly and then projects angularly rearward beneath worm 66, terminating at a point rearwardly thereof. A saddle member 78 is suitably secured at the end of support member 72 and includes upwardly extending spaced arms 80, each having an inwardly extending pin 81 from which a coupling nut 82 is pivotally suspended. One end of sheath 70 is secured to coupling nut 82 while cable 16 extends therethrough and is operatively connected to worm 66 by means of flexible coupling 84. When so connected, worm 66, coupling 84, and coupling nut 82 lie on a common axis.

Actuator 14 includes a generally tubular body member 86 which is received through the apertured support panel 88 at a convenient point on the vehicle interior and clampingly secured thereto between the shoulder 90 and nut 92. Body member 86 is counter-bored at one end to receive the opposite end of sheath 70 which is secured in place therein by packing 94 and nut 96. The opposite end of cable 16 extends through the center bore 97 of body 86 to be received within an axially aligned bore of actuator knob 98 and secured therewithin by set screw 100. The shank portion of knob 98 is received within an outer recess 102 of body 86 and is axially shiftable therein.

During operation of the mirror mechanism it will be observed that the mirror 56 may be adjusted to any desired position by merely rotating knob 98 to position the mirror about a vertical axis and axially shifting knob 98 to position the mirror about a horizontal axis. Thus, referring to FIGURE 2, rotational movement of knob 98 is transmitted by cable 16 to worm 66 which in turn drives worm wheel 68 to rotate shaft 46 about its axis. Axial movement of knob 98, on the other hand, axially shifts cable 16 within its sheath and the aforementioned unit comprising mirror assembly 52, shaft 46, and pivot member 30 is thereby pivotally rotated about the horizontal axis through pivot pins 38. Convenient stops may be provided at any of several points in the system to limit the axial movement of cable 16.

Various changes and modifications may be made to the above-described embodiment without departing from the spirit of the invention. Such changes and modifications are contemplated by the inventor who does not wish to be limited except by the scope of the appended claims.

I claim:

1. A remotely controlled mirror mechanism comprising, a mounting bracket, a pivot member associated with said mounting bracket and pivotally movable about a first axis, said pivot member supporting a shaft for rotation about a second axis substantially normal to said first axis, a mirror assembly attached to one end of said shaft for movement therewith, said pivot member together with said shaft and said mirror assembly being pivotally movable as a unit about said first axis, means including an operating cable operatively connected to said shaft and said pivot member such that rotation of said cable rotates said shaft to position said mirror assembly about said second axis and axial movement of said cable pivots said pivot member to position said mirror assembly about said first axis, and actuator means remotely located from said mirror bracket for causing rotation and axial movement of said operating cable.

2. The mechanism of claim 1 wherein gear means connect said operating cable with said shaft.

3. A remotely controlled mirror mechanism comprising, a mounting bracket having socket means formed therein, a pivot member supported by said socket means for pivotal movement about a first axis, said pivot member having an aperture therethrough, a shaft located in said aperture and having end portions extending above and below said mounting bracket, said shaft being adapted to rotate about a second axis substantially normal to said first axis, a mirror assembly fixedly attached to one end of said shaft for rotation therewith, a first gear fixedly attached to the other end of said shaft, a second gear engageable with said first gear, a flexible cable operatively connected to said second gear for rotating said gear, and remotely located actuator means for actuating said cable whereby axial movement of said cable positions said mirror assembly about said first axis and rotation of said cable positions said mirror assembly about said second axis.

4. The mechanism recited in claim 3 wherein said first and second gears are a worm wheel and worm respectively.

5. The mechanism of claim 3 wherein said second gear is rotatably supported by the pivot member.

6. The mechanism of claim 3 wherein a trunnion located in said socket means supports the pivot member for movement about said first axis.

References Cited

UNITED STATES PATENTS

| | | | |
|---|---|---|---|
| 2,573,127 | 10/1951 | Von Bredow | 74—501 |
| 2,817,005 | 12/1957 | Cameron | 240—61.13 |
| 3,251,238 | 5/1966 | Fuqua | 74—501 |
| 3,253,509 | 5/1966 | Peters | 350—281 |

FRED C. MATTERN, Jr., *Primary Examiner.*

C. F. GREEN, *Assistant Examiner.*

UNITED STATES PATENT OFFICE
CERTIFICATE OF CORRECTION

Patent No. 3,411,372                                                              November 19, 1968

George A. Skillin

It is certified that error appears in the above identified patent and that said Letters Patent are hereby corrected as shown below:

Column 2, line 31, after "members" insert -- 64 --; line 32, cancel "suitable adapated" and insert -- suitably adapted --.

Signed and sealed this 10th day of March 1970.

(SEAL)
Attest:

Edward M. Fletcher, Jr.                                            WILLIAM E. SCHUYLER, JR.
Attesting Officer                                                       Commissioner of Patents